United States Patent [19]
Fischofer

(10) Patent No.: US 7,882,237 B2
(45) Date of Patent: Feb. 1, 2011

(54) TCP/IP PROXY UTILIZING TRANSPARENT ACKNOWLEDGEMENTS

(75) Inventor: William T. Fischofer, Cedar Park, TX (US)

(73) Assignee: nCipher Corporation Limited, Stoneham, MA (US)

( * ) Notice: Subject to any disclaimer, the term of this patent is extended or adjusted under 35 U.S.C. 154(b) by 935 days.

(21) Appl. No.: 11/312,010

(22) Filed: Dec. 19, 2005

(65) Prior Publication Data
US 2006/0136598 A1 Jun. 22, 2006

Related U.S. Application Data

(60) Provisional application No. 60/636,936, filed on Dec. 17, 2004.

(51) Int. Cl.
*G06F 15/173* (2006.01)
(52) U.S. Cl. ............... 709/227; 709/238; 370/229
(58) Field of Classification Search ........... 709/102, 709/238, 239, 240, 242, 227
See application file for complete search history.

(56) References Cited

U.S. PATENT DOCUMENTS 6,522,880 B1 * 2/2003 Verma et al. ............... 455/436
6,788,704 B1 * 9/2004 Lindsay ..................... 370/465
6,980,547 B1 * 12/2005 Gally et al. ................. 370/389
7,188,180 B2 * 3/2007 Larson et al. ............... 709/227
2003/0123466 A1 * 7/2003 Somekh et al. ............. 370/401
2003/0167342 A1 * 9/2003 Munger et al. ............. 709/238
2003/0178487 A1 * 9/2003 Rogers ....................... 235/454
2005/0102416 A1 * 5/2005 Miller-Smith ............. 709/238
2006/0013128 A1 * 1/2006 Connor et al. .............. 370/229
2006/0253765 A1 * 11/2006 Boer et al. .................. 714/749

\* cited by examiner

*Primary Examiner*—Wing F Chan
*Assistant Examiner*—Tesfay Yohannes
(74) *Attorney, Agent, or Firm*—John A. Fortkort; Fortkort & Houston P.C.

(57) ABSTRACT

A method is described herein for transmitting data from a first point (203) to a second point (205) on a network (201) via a proxy server (207). In accordance with the method, a first data packet is received from the first point at the proxy server without sending an acknowledgement packet to the first point. The first data packet is forwarded from the proxy server to the second point, and a second data packet is received from the second point at the proxy server. The second data packet is then forwarded to the first point along with an acknowledgement packet for receipt of the first data packet from the first point at the proxy server.

19 Claims, 1 Drawing Sheet

TCP/IP PROXY UTILIZING TRANSPARENT ACKNOWLEDGEMENTS

CROSS-REFERENCE TO RELATED APPLICATIONS

This application claims priority to U.S. provisional patent application Ser. No. 60/636,936, filed Dec. 17, 2004, and having the same title.

FIELD OF THE DISCLOSURE

The present disclosure relates generally to the transmission of TCP/IP packets over a network, and more specifically to methods for overcoming throughput anomalies in the ACK processing attendant to such transmissions.

BACKGROUND OF THE DISCLOSURE

Transmission Control Protocol/Internet Protocol (TCP/IP) data transport is designed to be "self-clocking", i.e., the faster a receiver can accept data, the faster it can be sent. However, this goal can be difficult to achieve in some network configurations and conditions. Current research has focused on two main areas. One of these areas concerns the problems associated with so-called "Long Fat Networks" (LFNs), where the challenge is to grow the TCP congestion window (cwnd) large enough and stably enough to permit full bandwidth utilization. The other area concerns the problems associated with asymmetric networks which exhibit different bandwidth and/or reliability metrics between uplinks and downlinks, such as are typically found in cable or digital subscriber line (DSL) and wireless networks.

The mechanism used by TCP/IP to achieve self-clocking data flow is through the processing of messages that acknowledge the reception of transmitted packets (ACKs). ACKs may be separate packets or may be piggybacked on reverse traffic packets. Ultimately, the rate at which data can be passed between two communicating parties over a TCP/IP connection is governed by the rate at which they can generate and consume ACKs generated by their partner.

SUMMARY OF THE DISCLOSURE

Figure 1:
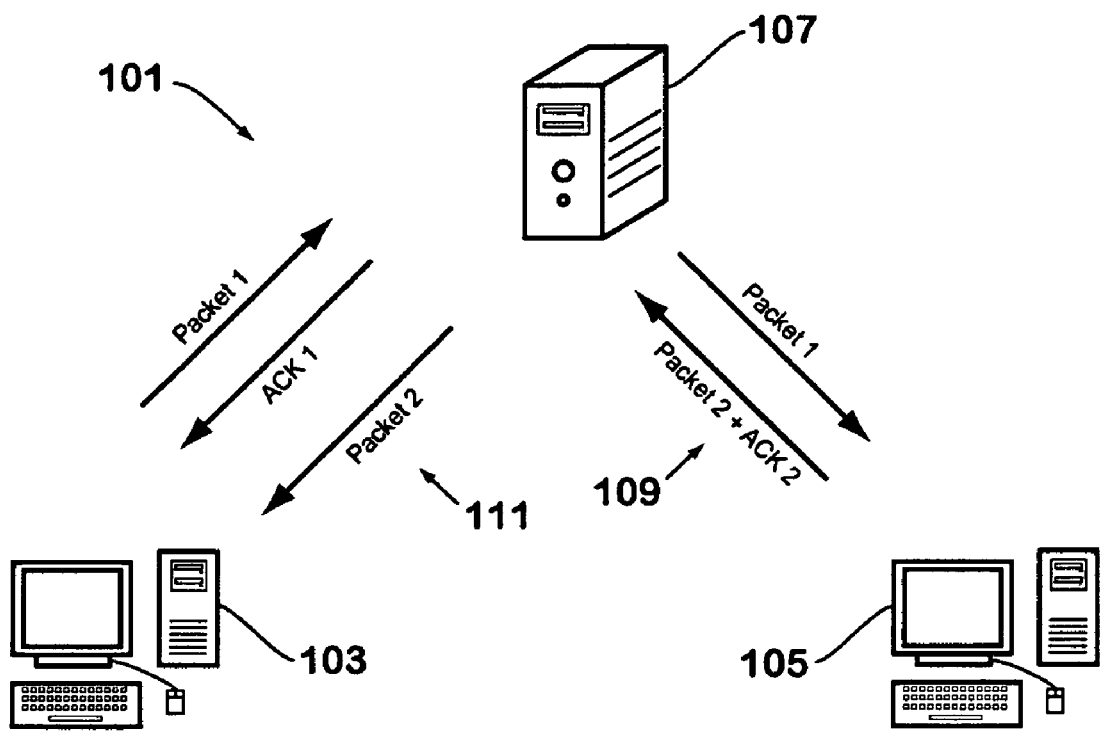
FIG. 1 is an illustration of a prior art network arrangement featuring a server, a client, and a proxy server.

In one aspect, a method is described herein for transmitting data from a first point to a second point on a network via a proxy server. In accordance with the method, a first data packet is received from the first point at the proxy server without sending an acknowledgement packet to the first point. The first data packet is forwarded from the proxy server to the second point, and a second data packet is received from the second point at the proxy server. The second data packet is then forwarded to the first point along with an acknowledgement packet for receipt of the first data packet from the first point at the proxy server.

In another aspect, a method for transmitting data from a first point to a second point on a network via a proxy server is provided. In accordance with the method, a first data packet is received from the first point at the proxy server without sending an acknowledgement packet to the first point, and the first data packet is forwarded from the proxy server to the second point. If a second data packet is received at the proxy server from the second point within t seconds, wherein $t \leq k$, and wherein k is a nonzero threshold value, then the second data packet is forwarded to the first point along with an acknowledgement packet for receipt of the first data packet at the proxy server. Otherwise, an acknowledgement packet is sent to the first point for receipt of the first data packet at the proxy server.

In yet another aspect, a method for transmitting data from a first point to a second point on a network via a proxy server is provided. In accordance with the method, the proxy server is operated in a first state if a Boolean status variable $x_s$ is true, and is operated in a second state if a Boolean status variable $x_s$ is false, herein $x_s$ is true if and only if either of the connections between the first point and the proxy and the second point and the proxy enter TCP/IP retransmission due to either timeout or receipt of three duplicate acknowledgement packets. When it is in the second state, the proxy server (a) receives a first data packet from the first point at the proxy server without sending an acknowledgement packet to the first point, (b) forwards the first data packet from the proxy server to the second point, and (c) if a second data packet is received at the proxy server from the second point within t seconds, wherein $t \leq k$, and wherein k is a nonzero threshold value, the proxy server forwards the second data packet to the first point along with an acknowledgement packet for receipt of the first data packet at the proxy server. Otherwise, the proxy server sends an acknowledgement packet to the first point for receipt of the first data packet at the proxy server.

In still another aspect, a network is provided which comprises first and second points, and a proxy server in communication with said first and second points. the proxy server is adapted to (a) receive a first data packet from the first point at the proxy server, (b) forward the first data packet from the proxy server to the second point, (c) receive a second data packet from the second point at the proxy server, and (d) forward the second data packet to the first point along with an acknowledgement packet for receipt of the first data packet from the first point at the proxy server.

These and other aspects of the present disclosure are described in greater detail below.

DETAILED DESCRIPTION

The introduction of fast silicon TCP/IP proxy engines introduces another class of TCP/IP flow control problem, which can be overcome utilizing approaches taught by this disclosure.

When a TCP/IP proxy (P) is introduced to mediate between a client (C) and server (S), the original connection between C<-->S becomes two connections, one between C<-->P and another between P<-->S, each of which are independently self-clocked via the TCP/IP ACK mechanism.

Because these two connections are coupled and yet are independently self-clocked, oscillations can develop which severely impact the aggregate throughput observed between C and S in the proxied configuration as compared to a direct connection. Although such effects will exist in any such coupled connection, they become highly significant when P is very fast, as is the case with a silicon proxy engine. Moreover, when P is very fast, P will tend to fill the receive buffer of C immediately in a highly bursty manner. The communication medium connecting P to C will then fall idle relative to the P<-->C connection while awaiting ACKs from C to P indicating that capacity for additional data is available. If such idle times develop, C will necessarily exhibit start-stop processing behavior relative to data received from P.

One of the benefits achieved by TCP/IP proxies is that connections can be "groomed" so that overhead accompanying TCP functions, such as out-of-order packets and retransmissions occurring on one side of a proxied connection, can be shielded from the other side, thus eliminating the TCP/IP overhead which would be required to handle these features directly.

The mechanism for TCP/IP proxy utilizing transparent acknowledgements as described herein may be understood as a method of allowing a proxied TCP/IP connection between two endpoints to retain the single self-clocking nature of a direct connection, even though the connection is being proxied. This mechanism can be switched on and off dynamically and automatically to preserve connection grooming.

What is described herein is at least one of the preferred embodiments of the present invention and several alternative aspects and variations. Those skilled in the art will understand that the present invention can be implemented in a number of different ways without departing from the spirit and scope of the invention and embodiments described herein. For example, if the proxy P which sits between C and S is not a single entity but is itself composed of multiple subproxies ($P_1 \ldots P_n$)) then this mechanism is equally applicable to such aggregate proxies as it is to a single proxy. Moreover, the terms "Client" and "Server" should be understood to cover any entities communicating via TCP/IP regardless of their roles in such communication.

A Proxy (P) which sits between a communicating Client (C) and Server (S) for the purpose of this disclosure is an entity which both terminates the TCP/IP connections between itself and C and between itself and S, and which logically connects them transparently such that C and S can usefully imagine that they are in direct communication with each other and that the proxy is not present. Note that this property holds even if the data is being transformed by P as, for example, if P is transparently performing encryption/decryption on the data stream or otherwise manipulating it such that the number of bytes in and out, as well as their TCP/IP sequence numbers, change as they flow between C and S through P.

A straightforward implementation of ACK processing in such a configuration is what gives rise to the throughput anomalies addressed by embodiments taught by this disclosure. Such a straightforward implementation may be understood with reference to the network 101 depicted in FIG. 1, which comprises a server 103 (S), a client 105 (C), and a proxy server 107 (P) disposed between them. The TCP/IP connections C<->P 109 and P<->S 111 are treated independently from a flow-control perspective. Thus, for example, data sent from S 103 to P 107 is ACK'd by P 107 independent of the state of the corresponding TCP/IP connection between C 109 and P 107.

Figure 2:
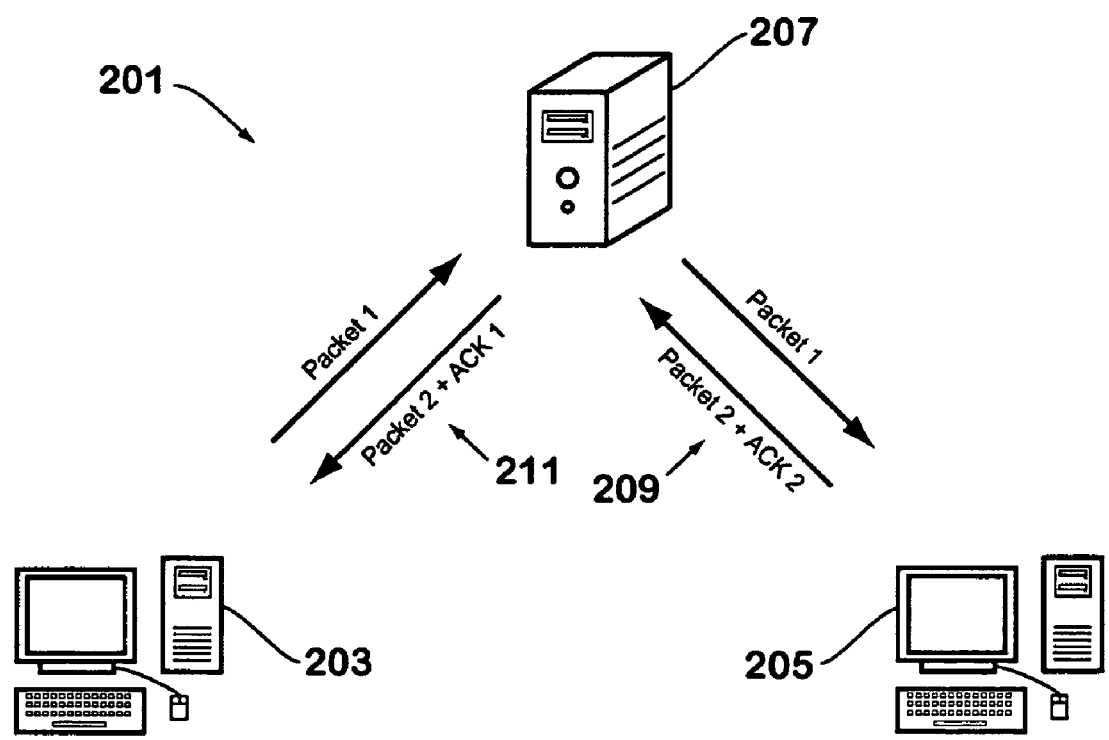
FIG. 2 is an illustration of a network in accordance with the teachings herein which features a server, a client, and a proxy server.

The present disclosure teaches modifications to this approach, which may be understood with reference to the particular, non-limiting embodiment of a network 201 depicted in FIG. 2. The network 201 depicted therein comprises a server 203 (S), a client 205 (C), and a proxy server 207 (P) disposed between them. TCP/IP connections C<->P 209 and P<->S 211 exist between the client and proxy server, and between the proxy server and server, respectively. The modifications to the conventional approach to ACK processing as described above are as follows:

1. When a data packet is received by P from S, P does not generate an ACK packet back to S as would normally be the case.

2. The return flow of data from C to S (through P) will naturally "piggyback" ACKs covering the data sent from S to P as described above.

3. Should C issue a non-duplicate zero-length ACK packet to P, P responds by generating an ACK packet of its own to S which covers all data received by P from S.

4. (Optional) Whenever P increases its receive window (tcpwin) it should immediately issue a zero-length ACK packet to ensure prompt notification to the other end of the connection.

A useful variation on (3) for tuning purposes is to propagate the ACK from C through P to S only if the amount of queued but unsent data from P to C is less than a specified threshold value.

To preserve the groomed nature of the TCP/IP flows between P and S (or C), two additional strategies are taught as variants within this disclosure:

5. Should either the C<->P or P<->S connections enter TCP/IP retransmission due to timeout or receipt of three duplicate ACKs, P immediately switches the opposite connection back to the "straightforward" mode described above wherein packets are ACK'd directly and independently. This mode persists until the retransmission on the opposite side is resolved, at which point the mechanism for TCP/IP proxy utilizing transparent acknowledgements can be resumed. Such dynamic switching isolates the non-retransmitting side from the delays and overhead associated with performing unnecessary retransmissions.

6. When a TCP/IP packet is received, e.g., by C, TCP protocol normally dictates that C set a "delayed ACK" timer (e.g., 200 milliseconds) to ensure that an ACK covering this data is generated in a timely manner in the event that no return data flow is presented to carry this ACK as a piggyback. Under this embodiment, P sets a "long delayed ACK" timer (e.g., 500 milliseconds) which is greater than the delayed ACK timer that C would use but less than the minimum retransmission timer value (1 second). This long delayed ACK timer allows time for a return ACK to be piggy-backed on return data, while also serving to ensure that an ACK will be generated even if C enters retransmission due to timeout, thereby preventing S from unnecessarily entering retransmission mode.

To illustrate these points for data flowing from S to C through P:

1. S sends a packet to P. P does not generate an ACK for this data but instead sets a long delayed ACK timer.

2. P forwards the data to C, after possibly having transformed it in some way.

3. Should C respond with data, when this data is forwarded by P to S (again after possible transformation) it will automatically carry an ACK of the original data sent from S to P in (1).

4. Should C respond with a zero-length non-duplicate ACK packet, P generates a zero-length ACK packet to S covering all data received to date from S.

5. Should the long delayed ACK timer set in (1) expire, P generates a zero-length ACK packet to S covering all data received to date from S. This prevents S from entering timeout retransmission should C fail to generate a timely ACK (possibly presaging that P will likely enter timeout retransmission mode in its connection to C).

6. Should the connection between P and C enter retransmission mode, either because P's retransmission timer covering the P->C connection expires or because P receives three duplicate ACK packets from C, then P immediately reverts to normal TCP ACK processing between itself and S until the retransmission between P and C is resolved, at which point P switches back to an ACK handling method taught by this disclosure.

7. When operating in TCP/IP proxy utilizing transparent acknowledgements mode, whenever P increases the size of its TCP receive window (tcpwin) it should immediately reflect this to S via a zero-length ACK packet.

The following are some of the benefits of one or more embodiments of the present invention:

1. By flowing ACKs between C and S across the proxied connections, P preserves the single self-clocking behavior of a direct connection between C and S even in the presence of the proxy. This results in dramatically improved data throughput between C and S (often a factor of ten or better) compared to the straightforward approach of managing ACKs independently between the two connections.

2. By having the capability to switch this behavior on and off dynamically in response to detected retransmission, TCP grooming of data from the non-retransmission side of the proxied connection is preserved and the overhead associated with retransmission is not propagated to the non-retransmission side.

3. By immediately propagating increases in its tcpwin value when in TCP/IP proxy utilizing transparent acknowledgements mode, the proxy P ensures minimal throughput impact which might otherwise occur.

4. The long delayed ACK mechanism disclosed herein provides some of the protection from asymmetric network problems between either C and P or S and P and by default C and S as defined in the prior art.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for transmitting data from a first point to a second point on a network via a proxy server, comprising:
   receiving a first data packet from the first point at the proxy server, wherein the first point has an adjustable receive window associated with it, and wherein, when the first point increases its adjustable receive window, it issues a zero-length acknowledgement packet to the second point,
   forwarding the first data packet from the proxy server to the second point;
   receiving a second data packet from the second point at the proxy server, wherein the proxy server comprises sub-proxies (P1 . . . Pn), wherein n>2; and
   forwarding the second data packet to the first point along with an acknowledgement packet for receipt of the first data packet from the first point at the proxy server.

2. The method of claim 1 wherein, if the second point issues a non-duplicate zero length acknowledgement packet to the proxy server in response to receipt of the first data packet at the second point, then the proxy server sends to the first point an acknowledgement packet in response to its receipt of the first data packet at the proxy server.

3. The method of claim 1, wherein the first point is a server and the second point is a client.

4. The method of claim 1, wherein the second data packet is forwarded to the first point along with an acknowledgement packet for receipt of the first data packet at the proxy server only if the amount of queued but unsent data from the proxy to the second point is less than a predetermined threshold value k.

5. The method of claim 1, wherein the acknowledgement packet for receipt of the first data packet by the server is piggybacked on the acknowledgement packet for receipt of the first data packet by the second point.

6. The method of claim 1, wherein the first and second data packets are TCP/IP data packets.

7. The method of claim 1 wherein the proxy server is adapted to set a delayed acknowledgement timer upon receipt by the proxy server of the first data packet.

8. The method of claim 7 wherein, if the delayed acknowledgement timer expires prior to receipt at the proxy server of an acknowledgement packet from the second point for receipt at the second point of the first packet, then the proxy server sends an acknowledgement packet to the first point for receipt at the proxy server of the first packet.

9. The method of claim 8, wherein the acknowledgement packet sent from the proxy server to the first point in the event that the delayed acknowledgement timer expires is a zero length acknowledgement packet.

10. The method of claim 1, wherein the proxy server is a silicon proxy engine.

11. A set of non-transitory computer instructions, disposed in a tangible non-transitory medium, for carrying out the method of claim 1.

12. A method for transmitting data from a first point to a second point on a network via a proxy server, comprising:
   receiving a first data packet from the first point at the proxy server;
   forwarding the first data packet from the proxy server to the second point; and
   if a second data packet is received at the proxy server from the second point within t seconds, wherein $t \leq k$ and wherein k is a nonzero threshold value, then forwarding the second data packet to the first point along with an acknowledgement packet for receipt of the first data packet at the proxy server, otherwise sending an acknowledgement packet to the first point for receipt of the first data packet at the proxy server.

13. The method of claim 12, wherein k is greater than the delayed acknowledgement timer set by TCP protocol for the second point to send to the proxy an acknowledgement packet for receipt of the first data packet.

14. The method of claim 13, wherein k is less than the minimum retransmission timer value governing the receipt of the first packet by the second point.

15. A method for transmitting data from a first point to a second point on a network via a proxy server, comprising:
   operating the proxy server in a first state if a Boolean status variable $x_s$ is true, wherein $x_s$ is true if and only if at least one of the connections between the first point and the proxy and the second point and the proxy enter TCP/IP retransmission; and
   operating the proxy server in a second state if a Boolean status variable $x_s$ is false; wherein, in the second state, the proxy server (a) receives a first data packet from the first point at the proxy server, (b) forwards the first data packet from the proxy server to the second point, and (c) if a second data packet is received at the proxy server from the second point within t seconds, wherein $t \leq k$ and wherein k is a nonzero threshold value, then the proxy server forwards the second data packet to the first point along with an acknowledgement packet for receipt of the first data packet at the proxy server, otherwise the proxy server sends an acknowledgement packet to the first point for receipt of the first data packet at the proxy server.

16. The method of 15 wherein, in the first state, the proxy server sends an acknowledgement packet to the first point upon receipt of a data packet from the first point.

17. The method of claim 15, wherein $x_s$ is true if and only if at least one of the connections between the first point and the proxy and the second point and the proxy enter TCP/IP retransmission due to either timeout or receipt of three duplicate acknowledgement packets.

18. The method of claim 1, wherein the first data packet is exchanged between the first point and the proxy server over a TCP/IP connection.

19. The method of claim 18, wherein the second data packet is exchanged between the second point and the proxy server over a TCP/IP connection.

* * * * *